Sept. 21, 1971  J. F. ROBBINS  3,606,659
METHOD OF COUPLING AND/OR JOINING LINED PIPE
Filed Nov. 18, 1969

INVENTOR.
JAMES F. ROBBINS
BY
ATTORNEY

United States Patent Office 3,606,659
Patented Sept. 21, 1971

3,606,659
METHOD OF COUPLING AND/OR JOINING LINED PIPE
James F. Robbins, Westford, Mass., assignor to Sybron Corporation, Rochester, N.Y.
Filed Nov. 18, 1969, Ser. No. 877,746
Int. Cl. B21d *53/00;* B21k *29/00;* B23p *15/26*
U.S. Cl. 29—157                           4 Claims

ABSTRACT OF THE DISCLOSURE

Disclosed is a coupling and a method for joining tin lined tubings wherein a portion of the tubing is removed to expose a portion of the tin lining. The exposed lining is then flared over the end of the tubing so that during connection of the tubing to a fitting by conventional ferrule and nut means, the flared tin is forced against and over the ferrule to form a joint completely lined with tin including a layer of tin between the opposed pipe and fitting faces.

BACKGROUND OF THE INVENTION

The present invention relates generally to a coupling for lined pipe and, more specifically, to a nut and ferrule coupling and a coupling method wherein the lining of the pipe extends over both the joined end surfaces of the pipe and over the ferrule to assure a continuous unbroken lining through the coupling.

Lined pipe and fittings are used in a wide variety of applications where the lining material is relatively expensive and lacking in the necessary physical strength but is necessary for its corrosion or non-toxic properties. For example, it is common practice in pure water systems to construct the stills, holding tanks, fittings and pipe of a more common base metal such as steel, copper or brass and then line the internal surface of such components with tin. Such construction combines the non-corrosive, non-toxic properties of tin with the higher strength and lower cost of the base metal. A problem exists, however, in the preparation of the ends of pipe sections for coupling or joining. This problem is due to the fact that if the pipes are merely cut off, the base metal of the pipe at the cut-off end would be exposed in the joint and could come into contact with the pure water flowing through the joint.

One method for protecting the cut-off end face of the pipe is first to machine and recess the pipe exterior partway back from the end face. The end of the pipe is then built up with a material similar to the lining to fill the recess portion and cover the end of the pipe with the lining material. A thread is then cut into the lining material filling the recess portion of the pipe, with the thread continuing into the base metal of the pipe for strength. This work cannot economically be done by workers in the field so that any odd length of pipe needed in the field must be returned to the factory for preparation or must be ordered especially.

Various other methods for joining lined tubing as shown, for example, in Pat. Nos. 2,613,958 and 3,020,068 require specially made ferrules or gaskets and for a variety of reasons have not proven particularly satisfactory.

The present invention provides a simple solution to the problems of joining lined pipes and provides a method which can readily be performed by workmen in the field. The coupling according to the present invention produces a strong, face-to-face joint wherein strength is obtained by joining the base metal of the pipe to the base metal of the fitting. Furthermore, the lining material of the coupling is continuous through the joint and extends between all joined surfaces of the base metal. Such construction avoids all possibility of contamination by contact of the base with the fluid flowing through the pipes.

SUMMARY OF THE INVENTION

In the present invention, a short, longitudinal section of base metal is removed by standard pipe cutting techniques from the end of the pipe to expose a portion of the lining. A nut and ferrule having an axially tapered outer surface is placed over the pipe adjacent to the cut-off portion and the exposed lining portion is then flared radially outward to form a washer of lining material over the exposed end of the cutoff pipe. The ferrule and pipe end are then drawn into a lined fitting with a tapered seat by a nut engaging the ferrule and threaded to the fitting. In joining the nut to the fitting, the washer of lining material which extends over the pipe end and between the fitting and pipe end, is driven back over the ferrule and is clamped between the ferrule and tapered fitting seat so that there is a positive butting of the pipe and fitting. This provides a strong coupling because the stronger base metal carries substantially all the joining stresses and a joint wherein the lining completely isolates all portions of the base metal from liquid flowing through the joint.

OBJECTS OF THE INVENTION

The primary object of the present invention is to provide a method for forming a joint between sections of threadless lined pipe which can be performed by workmen in the field.

Another object of the present invention is to provide a method for joining lined metal pipe which can be performed with hand tools which are easily used by any workman.

A further object of the present invention is to provide a coupling for lined pipe wherein the lining material extends between the coupling and the ends of the pipe to assure a continuous unbroken lining through the joint to isolate the base metal from liquid flowing through the pipe.

A still further object of the present invention is to provide a coupling for threadless pipe wherein the joining stress are carried by the base metal of the pipe and coupling.

These and other objects, advantages and characterizing features of the present invention will become more apparent upon consideration of the following detailed description when taken in connection with the accompanied drawings.

DESCRIPTION OF THE PREFERRED EMBODIMENTS

Figure 1:
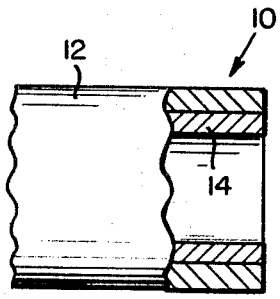
FIGS. 1–5 show in section a step-by-step method of joining lined pipes according to the present invention.

Referring to the drawings FIG. 1 shows a lined pipe generally indicated at 10. The pipe has an outer casing or sheath 12 and an inner lining 14. For pure water systems, it is preferred that the sheath be copper and the lining be tin. In usual practice, such a pipe is made by slidably inserting a tin tube into the copper sheath and then forcing a steel ball through the tin tube with water pressure. The diameter of the ball is such that as it passes through the tin tube, the ball forces the tin out against the inner surface of the copper sheath to form a mechanical bond between the sheath and the tubing. The pipe is made in this manner by the factory in standard lengths and since no factory operation is required to prepare the pipe for joining, these standard lengths can be shipped directly to the job site.

At the job site, the workmen then may use any suitable pipe cutting tool to cut the standard lengths of pipe to the length desired.

Figure 2:
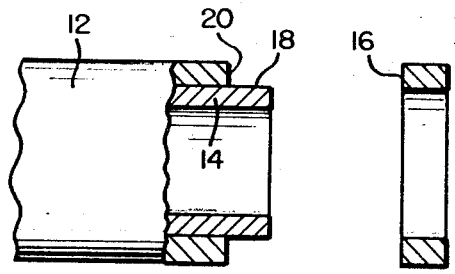

After the pipe has been cut to the desired length, the workmen then performs the first step of preparing the pipe for joining. This step, as illustrated in FIG. 2, is to remove a washer-shaped section 16 of the sheath so as to expose a portion of the lining 18 beyond the cut end 20 of the outer casing or sheath 12. This can be done with any suitable pipe cutting tool simply by cutting through the sheath and then stripping the cutoff section 16 from the lining. When cutting into the sheath to remove portion 16, the workmen should be careful not to cut into the lining 14. Further, the thickness of the cutoff portion 16 preferably should be such that the length of the exposed lining portion 18 is slightly greater than the combined wall thickness of sheath 12 and lining 14 for purposes set out hereinbelow.

Figure 3:
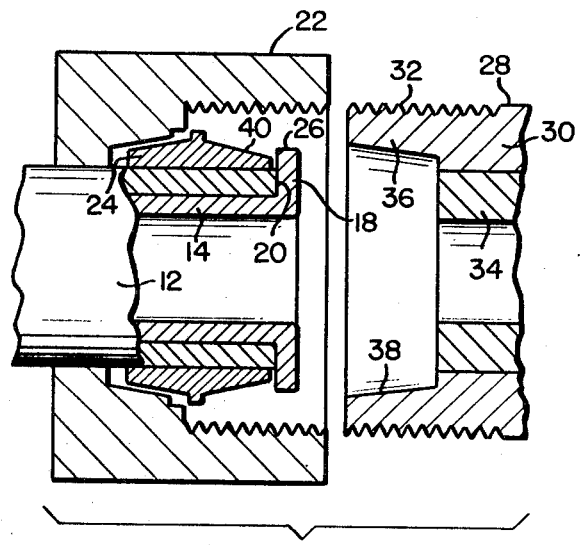

The next step as shown in FIG. 3 is to slidably place nut and ferrule 22, 24, respectively, over the end portion of the pipe. The exposed portion 18 of the lining is then flared radially outward as shown in FIG. 3 to form a washer which covers the exposed cut end 20 of the pipe sheath. Since, as stated hereinabove, the length of the exposed lining portion 18 is slightly greater than the combined wall thickness of the lining and sheath, the flared end 26 of the lining should extend slightly beyond the diameter of sheath 12. This not only acts to prevent the nut and ferrule from accidently sliding from the pipe but also provides the material necessary to form the completely tin lined joint of the present invention. It should be appreciated that flaring the exposed portion 18 of the lining radially outward is the only mechanical operation other than cutting the pipe to an appropriate length and removing portion 16 which is done by the workmen to prepare the pipe for joining. The pipe can now be joined, according to the present invention, to any suitable connector or fitting without further operations by the workmen other than the threading of nut 22 to a suitable connector or fitting 28.

FIG. 3 shows that the connector or fitting 28 includes an outer casing or sheath 30 having external threads 32 and an inner lining 34. In usual practice, casing 30 is a brass casting and for pure water system application, lining 34 should be of tin. Preferably, the thickness of tin lining 34 should be substantially equal to the combined wall thickness of the pipe sheath and lining 12, 14, respectively. The end of connector 28 which is to be joined to nut 22 has an outward extending flange 36. The inner surface 38 of this flange has an outward opening taper which is slightly less than a corresponding taper of the ferrule surface 40.

Figure 4:
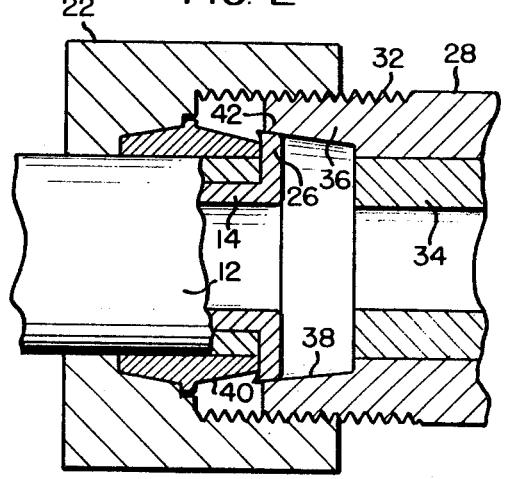
Figure 5:
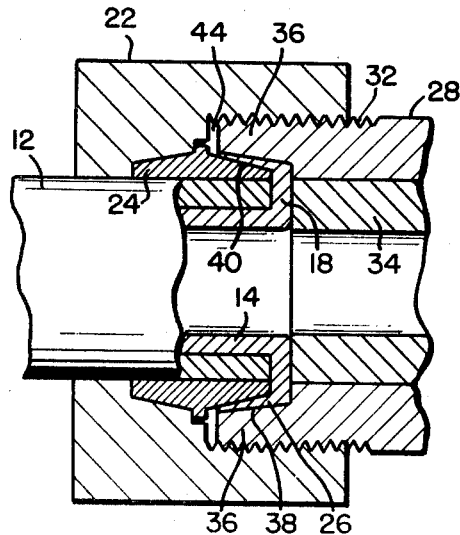
Figure 6:
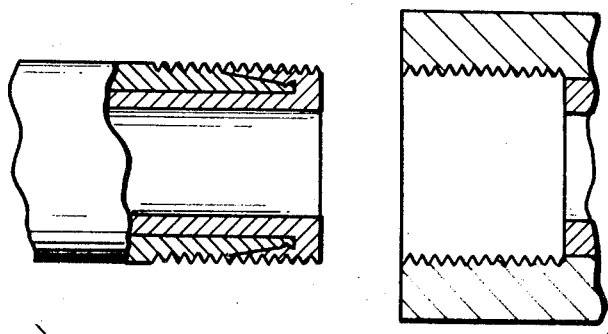
FIG. 6 is a sectional view showing the end section of a lined pipe prepared for joining in accordance with the prior art.

All that now remains to make the connection is to axially align connector 28 with nut 22 and then thread the nut to the connector. As shown in FIG. 4, threading the nut to the connector first draws the connector into the nut so that the leading edge 42 of connector flange 36 strikes the radially flared end 26 of the pipe lining. Since the tin material of the lining is softer than the brass material of the connector, further threading of the nut to the connector causes the connector to force the flared lining end 26 axially back over the tapered ferrule surface 40. Furthermore, because of the difference in tapers between ferrule surface 40 and flange surface 38, the engagement of these surfaces will wedge the ferrule radially inward against the outer surface of sheath 12. An important feature of the invention is that in the completed joint as shown in FIG. 5, connector flange 36 is wedged against the tapered surface 40 of the ferrule and has forced the ferrule into engagement with the outer surface of sheath 12, so that a strong mechanical bond is created which holds the pipe and connector together. This mechanical bond is formed by the engagement of ferrule 24 against the outer surface of the pipe 12, the engagement of nut 22 against ferrule 24 and the threaded engagement between nut 22 and threads 32 of connector 28. In addition, another important feature of the invention is that end 26 of the tin flange 18 has been deformed by the axially moving connector flange 36 so that in the completed joint, the flared lining end 26 fills the space between the inner surface 38 of the connector flange and ferrule surface 40. Any excess material from the lining will be extruded into the space 44 between flange 36 and nut 22. With the nut and connector fully mated, the end of connector lining 34 is butted against the flared portion 18 of the pipe lining and since tin is a malleable metal, the abutment will provide a liquid tight seal between the connector lining and the pipe lining.

Thus, it will be appreciated that the present invention accomplishes its intended objects in providing a method for connecting threadless lined pipes which can be performed by workmen in the field without the use of special tools. Further, the method insures that a portion of the pipe lining extends between the mated surfaces of pipe sheath 12 and connector casing 30 and surrounds ferrule surface 40 to insure substantially encapsulated joint which interposes the lining material between the fluid flowing through the pipe and the coupling members. The method further permits the workmen to cut standard lengths of pipe to any desired length and eliminates the need for the factory to stock several different lengths of pipe.

Having thus described the invention in detail, what is claimed as new is:

I claim:

1. A method for coupling threadless lined pipe comprising the steps of:
   (a) removing a portion of the outer sheath of said pipe at one end to expose a portion of the lining of said pipe;
   (b) sliding a ferrule member over said pipe;
   (c) flaring the exposed lining portion radially outward to form a washer of lining material over the end of the outer sheath which is integral with and a continuation of the lining of said pipe;
   (d) aligning said pipe and ferrule with a lined fitting, said fitting having an annular flange extending outwardly from about the lining of said fitting;
   (e) inserting said pipe and ferrule axially into said annular fitting flange, said flange engaging and forcing a portion of said washer axially back over said ferrule member; and
   (f) forcibly drawing said ferrule and pipe into said fitting flange to seat said washer against the end face of the fitting lining in a fluid tight abutment, clamp a portion of said washer between said flange and ferrule and seat said ferrule against said pipe.

2. A method as set forth in claim 1 wherein removing a portion of the outer sheath of said pipe exposes a length of the lining substantially equal to the thickness of the wall and lining of said pipe.

3. A method as set forth in claim 1 wherein the outer surface of said ferrule and inner surface of said flange are tapered and forcibly drawing said ferrule into said flange engages portions of said surfaces and wedges said ferrule against said pipe.

4. A method as set forth in claim 1 wherein forcibly drawing said ferrule and pipe into said fitting is accomplished by a nut which engages said ferrule and is threaded to said fitting.

References Cited

UNITED STATES PATENTS

| | | | |
|---|---|---|---|
| 2,226,039 | 12/1940 | Wiltse | 285—55X |
| 2,370,193 | 2/1945 | Reid | 285—55 |
| 2,998,984 | 9/1961 | Gressel | 285—55 |
| 3,047,937 | 8/1962 | De Vecchi | 29—157 |
| 3,253,841 | 5/1966 | Ahmad | 29—157X |
| 3,307,860 | 3/1967 | Blount et al. | 285—55 |

FOREIGN PATENTS

| | | | |
|---|---|---|---|
| 708,224 | 7/1941 | Germany | 285—55 |

CHARLIE T. MOON, Primary Examiner

U.S. Cl. X.R.

29—523, 526; 285—55